No. 788,955. PATENTED MAY 2, 1905.
J. W. SHONE.
MACHINE FOR MOLDING BUILDING BLOCKS.
APPLICATION FILED FEB. 27, 1904.

2 SHEETS—SHEET 1.

Witnesses
Walter D. Payne.
Russell B. Griffith

Inventor
James W. Shone
Frederick F. Church
his Attorney

No. 788,955. PATENTED MAY 2, 1905.
J. W. SHONE.
MACHINE FOR MOLDING BUILDING BLOCKS.
APPLICATION FILED FEB. 27, 1904.

2 SHEETS—SHEET 2.

Witnesses
Walter B. Payne.
Russell B. Griffith

Inventor
James W. Shone
By Frederick F. Church
his Attorney

No. 788,955.   Patented May 2, 1905.

UNITED STATES PATENT OFFICE.

JAMES W. SHONE, OF ROCHESTER, NEW YORK, ASSIGNOR OF ONE-HALF TO JOHN N. RAUBER, OF ROCHESTER, NEW YORK.

MACHINE FOR MOLDING BUILDING-BLOCKS.

SPECIFICATION forming part of Letters Patent No. 788,955, dated May 2, 1905.

Application filed February 27, 1904. Serial No. 195,524.

*To all whom it may concern:*

Be it known that I, JAMES W. SHONE, of Rochester, in the county of Monroe and State of New York, have invented certain new and useful Improvements in Machines for Molding Building-Blocks; and I do hereby declare the following to be a full, clear, and exact description of the same, reference being had to the accompanying drawings, forming a part of this specification, and to the reference-numerals marked thereon.

My present invention relates to machines for making molded building-blocks, such as are constructed of concrete or mixtures of sand and cement or other silicious materials; and it has for its object to provide a machine embodying generally a support on which may be mounted a removable pallet and a mold-box embodying side and end pieces capable of relative adjustment to adapt the machine for making blocks of various sizes and which are capable of being separated to permit the finished block to be removed and returned to their original position of adjustment to perform subsequent operations.

To these and other ends the invention consists in certain improvements and combinations of parts, all as will be hereinafter described, and the novel features pointed out in the claims at the end of the specification.

Figure 1:
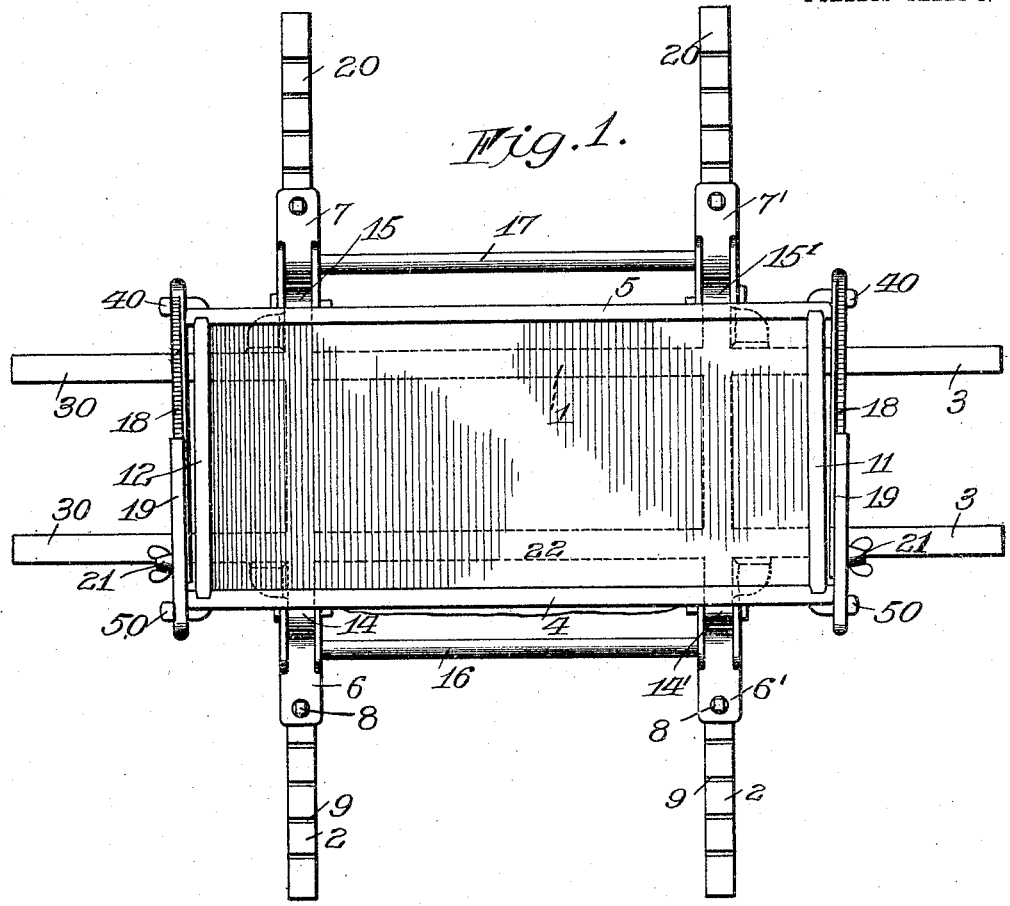
Figure 5:
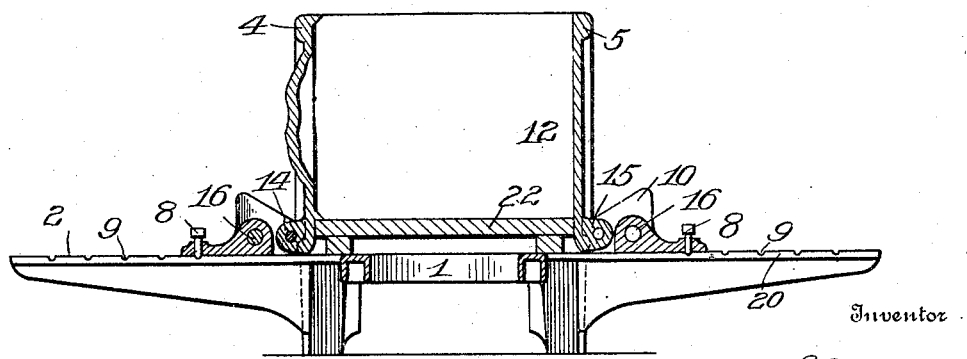
Figure 2:
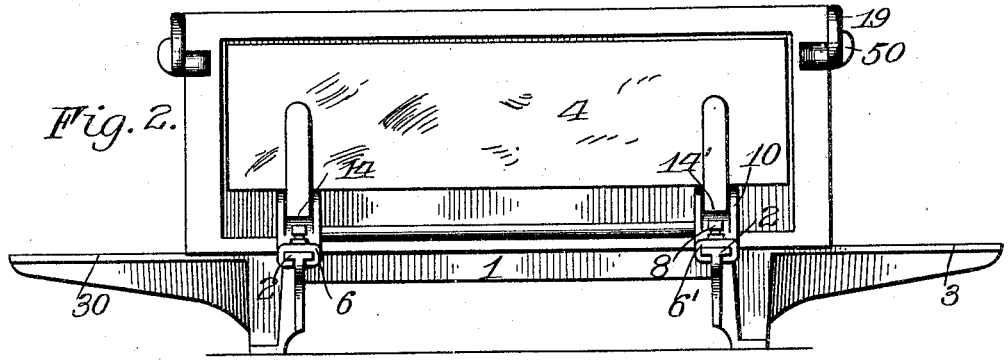
Figure 4:
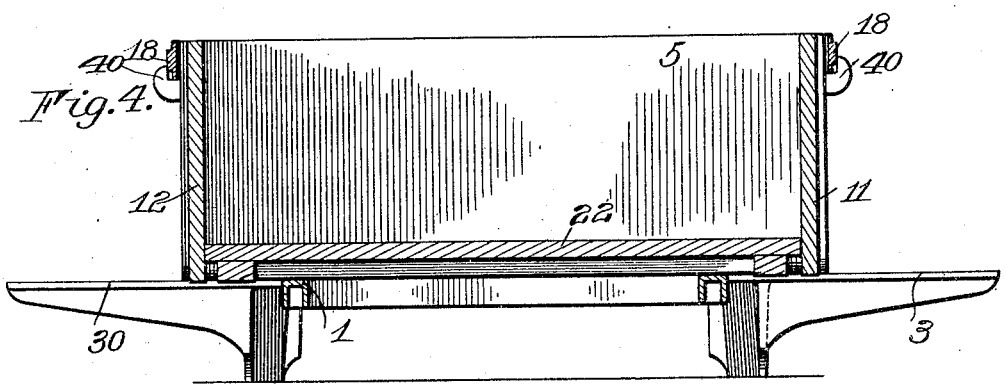
Figure 3:
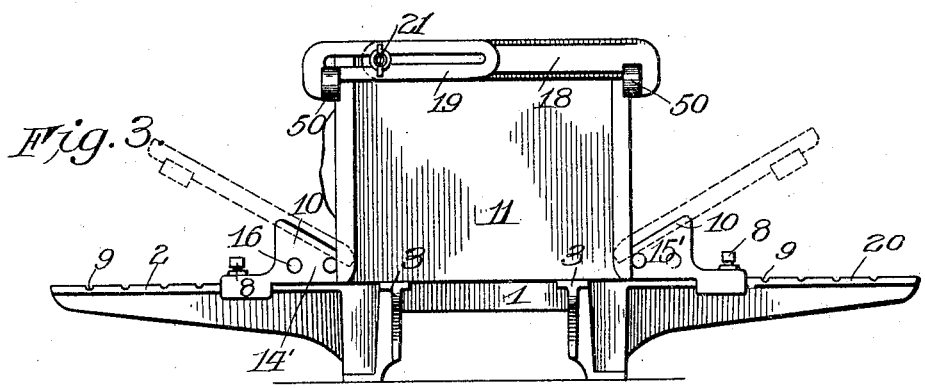

In the drawings, Figure 1 is a top plan view of a machine constructed in accordance with my invention. Figs. 2 and 3 are side and end views thereof, respectively. Fig. 4 is a longitudinally-sectional view, and Fig. 5 is a cross-sectional view.

Similar reference-numerals in the several figures indicate similar parts.

In the manufacture of artificial-stone blocks composed of mixtures of sand, gravel, or stone and cement it is necessary to place the ingredients in a suitable mold, and after they are given the desired form and the silicious materials have set they are removed and allowed to dry, and my present invention comprehends a machine in which blocks may be molded and removed without liability of being injured by shocks or concussion.

A machine constructed in accordance with my invention embodies a frame forming a bed or support 1, at opposite sides of which are outwardly-extending arms 2 2 and 20 20, and at the ends are arms 3 3 and 30 30, all of said arms being arranged in the same horizontal plane and provided with the flat upper surfaces forming supports for the various portions of the mold-box, as will be further described. The mold-box is composed of the front side piece 4, which may have its inner surface carved or otherwise marked to give the desired face to the block, and the rear side piece 5, both of said pieces being provided at their lower ends with outwardly-extending lugs or projections 14 14' and 15 15', which are journaled, respectively, to the blocks or heads 6 6' and 7 7', connected by rods 16 and 17. These connected heads form bearing-frames which are supported and movable longitudinally on the side arms 2 and 20, whereby the side pieces of the mold-box may be moved relatively toward and from each other. As a convenient means of constructing the parts I form the arms with laterally-extending edges, and the head portions of the bearing-frames are provided with the overhanging fingers engaging beneath the edges of the arms, as shown in Figs. 2 and 3, and in the upper sides of the heads any suitable form of securing devices are provided, which in the present instance are illustrated as bolts 8, which are adapted to engage notches or depressions 9 in the faces of the arms. In order to limit the outward movement of the side pieces, the heads are provided with the upwardly-extending stops 10. The end boards of the mold (indicated by 11 and 12) are preferably rectangular in shape and adapted to engage the ends of the side pieces and to rest in notches or grooves formed in the proximate faces thereof, as shown particularly in Fig. 1, the parts of the mold-box all being held in operative position by means of clamping-bars having the ends adapted to engage lugs or projections 40 and 50, formed on the ends of the side pieces. However, as the machine is adapted for molding blocks of various dimensions, which may vary either in length or thickness, or both, and if the block is to be increased in thickness it is necessary to move the bearing-frames outwardly, employing end boards of a greater length than those shown, and to accomplish this I form the clamping devices of two members 18 and 19, guided upon each other, one of them being provided with a bolt operating through a slot in the other member and having a clamping-nut 21 engaging therewith.

When it is desired to form a block of given dimensions, a pallet 22 is selected having the required length and breadth. The side pieces 4 and 5 of corresponding length are then secured to the bearing-frames and the latter adjusted upon the arms 2 and 20 to the required position. The end boards are then fitted between the side pieces and the clamps adjusted to hold the parts in operative position. The ingredients may then be packed in the mold and the clamps removed, permitting the side pieces to be revolved outwardly upon their bearings to the position shown in dotted lines in Fig. 3, which operation releases the end boards and leaves the molded block resting upon the pallet 22, which may then be removed from the frame or support 1 and another substituted therefor, and by restoring the parts of the mold to their normal position a subsequent operation may be performed.

A molding-machine constructed in accordance with my invention consists of few parts, which are simple in construction and capable of being easily operated. The adjustment of the side pieces toward and from each other and their capability of being detached from the bearing-frames and others substituted in place of them permits building-blocks of different sizes to be molded, and by employing removable pallets the blocks may be transported thereon and allowed to become thoroughly dried and set, thus preventing the possibility of injuring the blocks when removing them from the mold.

I claim as my invention—

1. The combination with a bed, a pallet thereon and relatively movable bearing-frames at each side thereof, of side pieces hinged to the frames, end boards between said sides and clamps coöperating with the latter to hold the sides and ends in operative position.

2. The combination with a bed, a pallet thereon and bearing-frames movable relatively on the bed, of side pieces journaled on the frames, end boards coöperating therewith and clamps for locking the side pieces and end boards in operative position.

3. The combination with a bed, a pallet thereon and bearing-frames movably mounted on the bed, of side pieces journaled on the frames, end boards engaging the side pieces and clamps extending between the latter to hold them in operative position, said clamps being adjustable to coöperate with the sides when moved relatively on the bed.

4. The combination with a bed, a pallet thereon and bearing-frames movably mounted on the bed, of side pieces journaled on the frames having recesses in their proximate faces, end boards engaging said recesses and adjustable clamps for holding the side pieces and end boards in operative position.

5. The combination with a bed, a pallet thereon and bearing-frames adjustable relatively toward and from each other and located at opposite sides of the pallet, of side pieces journaled on the frames, end boards coöperating therewith and clamps embodying relatively adjustable members adapted to coöperate with the side pieces.

6. The combination with a support having arms extending at opposite sides thereof, a removable pallet on the support and bearing-frames movably mounted on the arms, of side pieces journaled on the frames, end pieces engaging therewith and clamps for holding the sides and ends in operative position.

7. The combination with a support having arms extending at opposite sides thereof, a removable pallet on the support and bearing-heads guided on the arms, of means for securing the heads in relative positions of adjustment, side pieces journaled on the heads extending above the pallet and having recesses in their proximate faces, end boards fitting said recesses and resting on the support and means for securing the sides and ends in operative position.

8. The combination with a support having projecting arms at its ends and sides, bearing-heads movably mounted on the side arms and side pieces journaled on the heads, of end boards engaging the side pieces and resting on the arms at the ends of the support, means for holding the sides and ends in operative position and a removable pallet inclosed within said parts.

9. The combination with a support having arms extending at its sides provided with overhanging edges, heads guided on the arms and embracing said edges and means for clamping them to the arms, of side pieces movably attached to the heads, end boards coöperating with the side pieces and means for holding said sides and ends in operative position.

10. The combination with a support having separated arms extending at opposite sides, heads movable longitudinally thereon and a bar connecting the heads on adjacent arms, of means for clamping the heads thereon, side pieces journaled on the latter having grooves in their proximate faces, end boards secured therein and resting on the support, means for holding the parts in operative position and a pallet resting on the support.

JAMES W. SHONE.

Witnesses:
G. WILLARD RICH,
RUSSELL B. GRIFFITH.